US006251961B1

United States Patent
Pirig et al.

(10) Patent No.: US 6,251,961 B1
(45) Date of Patent: Jun. 26, 2001

(54) FLAME-RETARTANT COATING

(75) Inventors: Wolf-Dieter Pirig, Euskirchen; Volker Thewes, Monheim, both of (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 09/517,486

(22) Filed: Mar. 2, 2000

(30) Foreign Application Priority Data

Mar. 4, 1999 (DE) .............................. 199 09 387

(51) Int. Cl.$^7$ .................................................. C08G 59/42
(52) U.S. Cl. .................... 521/179; 524/100; 524/119; 524/386; 524/387; 524/494
(58) Field of Search .................. 523/179; 524/100, 524/119, 386, 387, 494

(56) References Cited

U.S. PATENT DOCUMENTS

| | | | |
|---|---|---|---|
| 4,104,073 | * 8/1978 | Koide et al. .................. | 106/155 P |
| 4,515,632 | 5/1985 | Maurer et al. . | |
| 4,879,320 | 11/1989 | Hastings . | |
| 4,965,296 | 10/1990 | Hastings . | |
| 5,225,464 | 7/1993 | Hill, Jr. . | |
| 5,563,208 | 10/1996 | König et al. . | |
| 5,749,948 | 5/1998 | Scholz et al. . | |
| 6,025,419 | * 2/2000 | Kasowski et al. ............ | 524/100 |
| 6,054,515 | * 4/2000 | Blount .......................... | 524/118 |

FOREIGN PATENT DOCUMENTS

| | | |
|---|---|---|
| 195 06 330 A1 | 8/1996 | (DE) . |
| 0 106 248 A2 | 4/1984 | (EP) . |
| 0 180 795 B1 | 5/1986 | (EP) . |
| 2 121 056 | 12/1983 | (GB) . |
| WO 98/08898 | 3/1998 | (WO) . |
| WO/98/45364 | 10/1998 | (WO) . |

OTHER PUBLICATIONS

Front page of Patent DE 42 18 184 See AD Above US 5,563,208.

Front page of Patent DE 43 43 668, See AE Above US 5,749,948.

* cited by examiner

*Primary Examiner*—Morton Foelak
(74) *Attorney, Agent, or Firm*—Susan S. Jackson; Scott E. Hanf

(57) ABSTRACT

The invention relates to a flame-retardant coating which forms an insulating layer and is based on substances which carbonize and form a foam layer in the event of a fire, on film-forming binders, on blowing agents and on customary auxiliaries and additives, wherein the blowing agent present comprises melamine polyphosphate. The novel flame-retardant coating which forms an insulating layer is particularly stable under tropical conditions (up to 100% rel. humidity, about 75° C.), i.e. it releases only an extremely small amount of $NH_3$.

10 Claims, No Drawings

FLAME-RETARTANT COATING

FIELD OF THE INVENTION

The invention relates to a flame-retardant coating which forms an insulating layer and is based on substances which carbonize and form a foam layer in the event of a fire, on film-forming binders, on blowing agents and on customary auxiliaries and additives.

DESCRIPTION OF THE RELATED ART

Flame-retardant coatings which form an insulating layer, also called intumesence coatings, foam when exposed to the temperatures prevailing in the event of a fire, and this foaming of the abovementioned flame-retardant coating prevents, or at least hinders, the passage of heat to steel construction members, ceilings, walls, cables, pipes and the like.

U.S. Pat. No. 4,965,296 A1 describes a flame-retardant material composed of a flame-retardant coating material and of an electrically conductive material. This flame-retardant coating material is composed of substances which carbonize and form foam, of a compound which produces gas, of a film-forming binder and of appropriate solvents. The usual other ingredients may be present if desired.

U.S. Pat. No. 4,879,320 describes a similar flame-retardant composition, but a ceramic fiber material has been added instead of a conductive material.

U.S. Pat. No. 5,225,464 describes an aqueous intumescence formulation based on a reaction product of phosphoric acid, melamine and monoammonium phosphate, which with pentaerythritol, with chlorinated hydrocarbons and with other compounds, in particular polyvinyl acetate, is intended to give an improved intumescence coating material.

A very wide variety of intumescent formulations are known from "Fire Retardants Formulations Handbook" (author: Vijay Mohan Bhatnagar, 1972).

DE 42 18 184 A1 describes an aqueous binder mixture composed of an aqueous solution and/or dispersion of a combination made from a) at least one NCO prepolymer which has urethane groups and blocked isocyanate groups and is soluble and/or dispersible in water in the presence of component b) and b) a polyamine component composed of at least one (cyclo)aliphatic polyamine having at least two primary and/or secondary amino groups.

Finally, DE 43 43 668 describes blowable flame-retardant coating compositions composed at least of
- from 4 to 25% by weight of a film-forming binder,
- from 10 to 4% by weight of ammonium polyphosphate,
- from 8 to 40% by weight of at least one substance which carbonizes on exposure to heat,
- from 6 to 25% by weight of a blowing agent,
- from 0 to 5% by weight of dispersing agent, and
- from 0 to 25% by weight of fillers.

A general disadvantage of the abovementioned flame-retardant coatings is that they contain halogen and/or have insufficient water resistance after drying.

The use of melamine as blowing agent is to be seen as particularly disadvantageous, since it reacts as a base in aqueous slurries. If, therefore, a flame-retardant coating which forms an insulating layer has a component which reacts as an acid in aqueous solution, the melamine is available as a reaction partner for this component. It is known that melamine and ammonium polyphosphate react in aqueous solution releasing ammonia ($NH_3$). At increased temperature and increased humidity this reaction can also take place in a dried flame-retardant coating which forms an insulating layer, thus reducing the flame-retardant properties of the coating.

The object of the present invention is therefore to provide flame-retardant coatings which form an insulating layer and which, without using melamine, are water-resistant after drying and also release only extremely small amounts of $NH_3$ at increased humidity and increased temperature.

SUMMARY OF THE INVENTION

This object is achieved by a flame-retardant coating of the type described at the outset which forms an insulating layer, wherein the blowing agent present comprises a melamine polyphosphate.

The melamine polyphosphate preferably has the formula $(HMPO_3)_n$, in which M is melamine and $n \geq 2$, in particular from 2 to 10,000.

DESCRIPTION OF THE PREFERRED EMBODIMENTS

Melamine polyphosphate is a polymer made from melamine units and phosphate units which have been linked to give relatively short or relatively long chains. The distribution of the melamine units and phosphate units may be regular or irregular, and they may, if desired, also have been polymerized within themselves. Derivatives of melamine, such as melem, melam and others, may also be present.

The properties of the melamine polyphosphate may vary within certain limits, due to its different chain lengths and to the distribution and/or frequency of the melamine units and phosphate units.

Melamine polyphosphate is described in more detail in PCT/WO 98/45364, for example, where it is also described as melamine salt of polyphosphoric acid. The polymeric chain here is composed of ($HMPO_3$) units [where M is melamine] and $n \geq 2$, in particular from 5 to 10,000.

Melamine polyphosphate is usually obtained by heating melamine pyrophosphate under nitrogen at temperatures of 290° C. and above to constant weight (PCT/WO 98/08898).

The flame-retardant coating which forms an insulating layer preferably comprises
- from 5 to 30 parts by weight of film-forming binder,
- from 10 to 50 parts by weight of foam-layer-forming substance,
- from 5 to 25 parts by weight of a substance which carbonizes,
- from 5 to 50 parts by weight of melamine polyphosphate, and
- from 10 to 50 parts by weight of customary auxiliaries and additives.

The flame-retardant coating which forms an insulating layer particularly preferably comprises
- from 10 to 20 parts by weight of film-forming binder,
- from 15 to 40 parts by weight of foam-layer-forming substance,
- from 7 to 15 parts by weight of a substance which carbonizes,
- from 7 to 40 parts by weight of melamine polyphosphate, and
- from 20 to 40 parts by weight of customary auxiliaries and additives.

The film-forming binders present in the flame-retardant coating which forms an insulating layer preferably comprise homopolymers based on vinyl acetate,
copolymers based on vinyl acetate, ethylene and vinyl chloride,
copolymers based on vinyl acetate and the vinyl ester of a long-chain branched carboxylic acid,
copolymers based on vinyl acetate and di-n-butyl maleate,
copolymers based on vinyl acetate and acrylates,
copolymers based on styrene and acrylates, and/or
copolymers based on acrylates,
vinyltoluene-acrylate copolymer,
styrene-acrylate copolymer,
vinyl-acrylate copolymer,
self-crosslinking polyurethane dispersions.

The foam-forming substances present in the flame-retardant coating which forms an insulating layer preferably comprise ammonium salts of phosphoric acids and/or of polyphosphoric acids.

The substances which carbonize and are present in the flame-retardant coating which forms an insulating layer preferably comprise carbohydrates.

The carbohydrates used preferably comprise pentaerythritol, dipentaerythritol, tripentaerythritol and/or polycondensates of pentaerythritol.

The auxiliaries or additives present in the flame-retardant coating which forms an insulating layer preferably comprise glass fibers, mineral fibers, kaolin, talc, aluminum oxide, aluminum hydroxide, magnesium hydroxide, precipitation silicas, silicates and/or pulverized celluloses.

The novel flame-retardant coating which forms an insulating layer is preferably halogen-free.

The novel flame-retardant coating which forms an insulating layer releases less than 200 ppm of $NH_3$ when stored at increased (atmospheric) humidity (up to 100% rel. humidity) and at increased temperature (about 75° C.).

The novel flame-retardant coating (intumescence coating) in the form of a spreadable, sprayable or rollable coating agent, is used in protecting a wide variety of substrates, preferably steel, wood, electrical cables or pipes.

In the following examples, intumescence coatings were prepared and applied to standard steel sheets, and their effectiveness was determined. Insulation properties were tested to DIN 4102, Part 8 (1986). Water resistance was tested by storing the coated standard steel sheets at 40° C. and 95% atmospheric humidity in a conditioning cabinet for 4 weeks prior to the insulation properties test.

To determine $NH_3$ release the dried sample sheets are placed in a sealed glass system composed of a 500 ml glass flask and a glass lid with 2 faucets. To simulate atmospheric humidity (about 100% rel. humidity) the glass system has a glass trough with 10 ml of water from the town supply. The glass system is placed in a circulating-air drying cabinet at 75° C. with one faucet closed. The second faucet is likewise closed after 10 minutes in the drying cabinet. The residence time of the flask in the drying cabinet from then on is 120 minutes. The flask is then removed from the drying cabinet and an adapter is used to provide one faucet with a Dräger tube. Nitrogen is supplied to the second faucet at a rate of 5 l per hour. The flask is flushed for 30 minutes and the amount of ammonia released is read off directly from the Dräger tube.

The products used in the examples were as follows:
®Pliolite (solid) (Goodyear, France)
This is a newtonian thermoplastic resin based on vinyltoluene-acrylate copolymers.
®Exolit AP 462 (Clariant GmbH, Frankfurt am Main, Germany)

This is a microencapsulated ammonium polyphosphate based on ®Exolit AP 422 prepared by the process of EP-B-0 180 795 and comprises about 10% by weight of capsule material composed of a cured melamine-formaldehyde resin.

®Exolit AP 422 (Clariant GmbH, Frankfurt am Main, Germany) is a free-flowing, pulverulent, low-water-solubility ammonium polyphosphate of the formula $(NH_4PO_3)$ with n=from 20 to 1000, in particular from 500 to 1000. The proportion of particles with particle size less than 45 µm is more than 99%.

EXAMPLE 1

(Comparative)

The following substances were mixed in succession and then applied appropriately to the sheet for testing:

38 parts by weight of ®Exolit AP 462
10 parts by weight of ®Pliolite (solid)
8 parts by weight of melamine
8 parts by weight of dipentaerythritol
8 parts by weight of titanium dioxide and to 100 parts by weight of thickener, plasticizer and solvent.

The fire test to DIN 4102 on the coated sheet gave the fire classification F 30.

The fire classification was likewise F 30 after the period of storage in the conditioning cabinet.

$NH_3$ release was measured as 4625 ppm of $NH_3$.

EXAMPLE 2

(Inventive)

The following substances were mixed in succession and then applied appropriately to the sheet for testing:

32 parts by weight of ®Exolit AP 462
10 parts by weight of ®Pliolite (solid)
13 parts by weight of melamine polyphosphate
8 parts by weight of dipentaerythritol
8 parts by weight of titanium dioxide and to 100 parts by weight of thickener, plasticizer and solvent.

The fire test to DIN 4102 on the coated sheet gave the fire classification F 60.

The fire classification was likewise F 60 after the period of storage in the conditioning cabinet.

$NH_3$ release was measured as 80 ppm of $NH_3$.

EXAMPLE 3

(Comparative)

The following substances were mixed in succession and then applied appropriately to the sheet for testing:

30 parts by weight of ®Exolit AP 422
22 parts by weight of polyvinyl acetate copolymer (50% strength)
19 parts by weight of melamine
13 parts by weight of pentaerythritol
5 parts by weight of titanium dioxide and to 100 parts by weight of thickener, fillers, water, dispersing agent and preservatives.

The fire test to DIN 4102 on the coated sheet gave the fire classification F 30.

The fire classification F 30 was no longer achieved after the period of storage in the conditioning cabinet.

$NH_3$ release was measured as 5200 ppm of $NH_3$.

EXAMPLE 4

(Inventive)

The following substances were mixed in succession and then applied appropriately to the sheet for testing:

18 parts by weight of ®Exolit AP 422
22 parts by weight of polyvinyl acetate copolymer (50% strength)
30 parts by weight of melamine polyphosphate
13 parts by weight of pentaerythritol
5 parts by weight of titanium dioxide and to 100 parts by weight of thickener, fillers, water, dispersing agent and preservatives.

The fire test to DIN 4102 on the coated sheet gave the fire classification F 30.

The fire classification was F 30 after the period of storage in the conditioning cabinet.

$NH_3$ release was measured as 180 ppm of $NH_3$.

EXAMPLE 5

(Comparative)

The following substances were mixed in succession and then applied appropriately to the sheet for testing:

30 parts by weight of ®Exolit AP 422
22 parts by weight of aliphatic urethane-acrylic hybrid dispersion (30% strength)
17 parts by weight of melamine
12 parts by weight of dipentaerythritol
5 parts by weight of titanium dioxide and to 100 parts by weight of thickener, fillers, water, dispersing agent and preservatives.

The fire test to DIN 4102 on the coated sheet gave the fire classification F 60.

The fire classification was still F 30 after the period of storage in the conditioning cabinet.

$NH_3$ release was measured as 4850 ppm of $NH_3$.

EXAMPLE 6

(Inventive)

The following substances were mixed in succession and then applied appropriately to the sheet for testing:

19 parts by weight of ®Exolit AP 422
22 parts by weight of aliphatic urethane-acrylic hybrid dispersion (30% strength)
27 parts by weight of melamine polyphosphate
12 parts by weight of dipentaerythritol
5 parts by weight of titanium dioxide and to 100 parts by weight of thickener, fillers, water, dispersing agent and preservatives.

The fire test to DIN 4102 on the coated sheet gave the fire classification F 60.

The fire classification was F 60 after the period of storage in the conditioning cabinet.

$NH_3$ release was measured as 130 ppm of $NH_3$.

As apparent from the examples, the use of melamine polyphosphate can reduce $NH_3$ release by a factor of at least 25 when compared with melamine.

What is claimed is:

1. A flame-retardant coating which forms an insulating layer and is based on substances which carbonize and form a foam layer in the event of a fire, on film-forming binders, on blowing agents and on customary auxiliaries and additives wherein the blowing agent present comprises melamine polyphosphate, wherein the substance that forms a foam layer comprises ammonium salts of phosphoric acid and/or ammonium salts of polyphosphoric acid, and wherein said coating releases less than 200 ppm of $NH_3$ in storage.

2. A flame-retardant coating which forms an insulating layer as claimed in claim 1, wherein the melamine polyphosphate has the formula $(HMPO_3)_n$, where M is melamine and $n \geq 2$, in particular from 2 to 10,000.

3. A flame-retardant coating which forms an insulating layer as claimed in claim 1, which comprises
   from 5 to 30 parts by weight of film-forming binder,
   from 10 to 50 parts by weight of foam-layer-forming substance,
   from 5 to 25 parts by weight of a substance which carbonizes,
   from 5 to 50 parts by weight of the melamine salt and/or of the guanidine salt, and
   from 10 to 50 parts by weight of customary auxiliaries and additives.

4. A flame-retardant coating which forms an insulating layer as claimed in claim 1, which comprises
   from 10 to 20 parts by weight of film-forming binder,
   from 15 to 40 parts by weight of foam-layer-forming substance,
   from 7 to 15 parts by weight of a substance which carbonizes,
   from 7 to 40 parts by weight of the melamine salt and/or of the guanidine salt, and
   from 20 to 40 parts by weight of customary auxiliaries and additives.

5. A flame-retardant coating which forms an insulating layer as claimed in claim 1, wherein the film-forming binders present comprise
   homopolymers based on vinyl acetate,
   copolymers based on vinyl acetate, ethylene and vinyl chloride,
   copolymers based on vinyl acetate and the vinyl ester of a long-chain branched carboxylic acid,
   copolymers based on vinyl acetate and di-n-butyl maleate,
   copolymers based on vinyl acetate and acrylates,
   copolymers based on styrene and acrylates, and/or
   copolymers based on acrylates,
   vinyltoluene-acrylol copolymer,
   styrene-acrylate polymers,
   vinyl-acrylate copolymers,
   self-crosslinking polyurethane dispersions.

6. A flame-retardant coating which forms an insulating layer as claimed in claim 1, wherein the substances present which carbonize comprise carbohydrates.

7. A flame-retardant coating which forms an insulating layer as claimed in claim 6, wherein the carbohydrates used comprise pentaerythritol, dipentaerythritol, tripentaerythritol and/or polycondensates of pentaerythritol.

8. A flame-retardant coating which forms an insulating layer as claimed in claim 1, wherein the auxiliaries or additives present comprise glass fibers, mineral fibers, kaolin, talc, aluminum oxide, aluminum hydroxide, magnesium hydroxide, precipitation silicas, silicates and/or pulverulent celluloses.

9. A flame-retardant coating which forms an insulating layer as claimed in claim 1, which is halogen-free.

10. A flame-retardant coating which forms an insulating layer as claimed in claim 1, which releases less than 200 ppm of $NH_3$ when stored under high-moisture conditions at up to 100% rel. humidity and at increased temperature (about 75° C.).

* * * * *